Oct. 5, 1954 — N. O. BRODERSON — 2,690,741
METHOD OF OPERATING INTERNAL-COMBUSTION ENGINES
Filed July 31, 1952 — 2 Sheets-Sheet 2
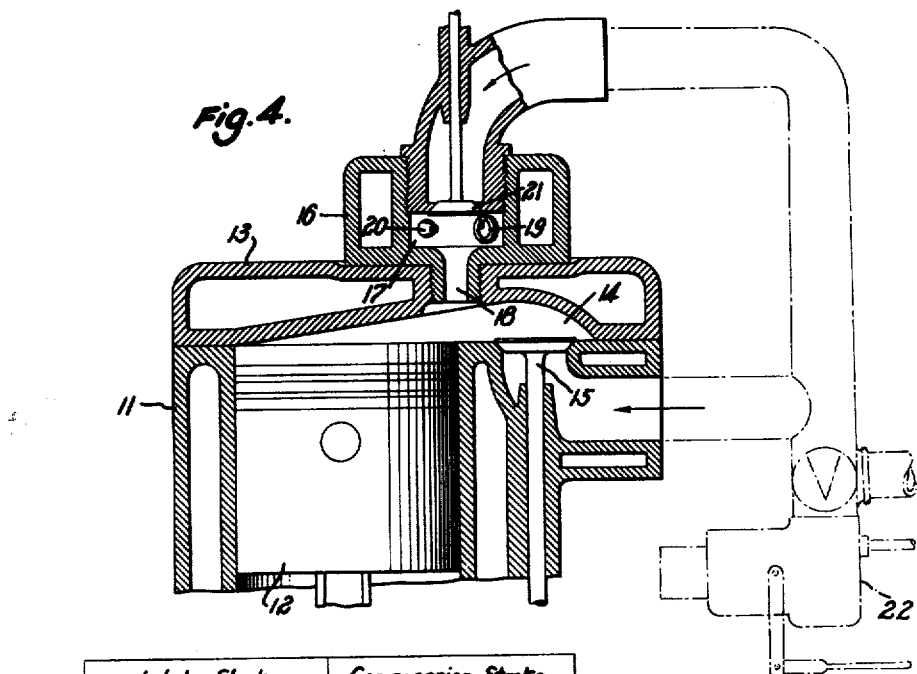
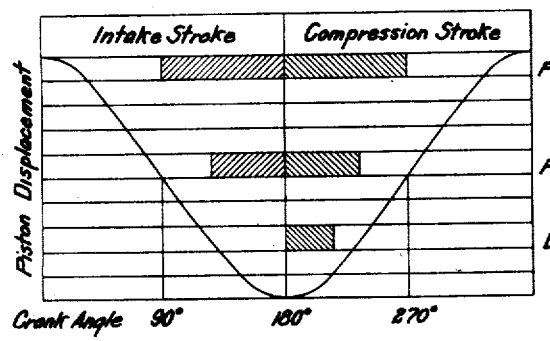
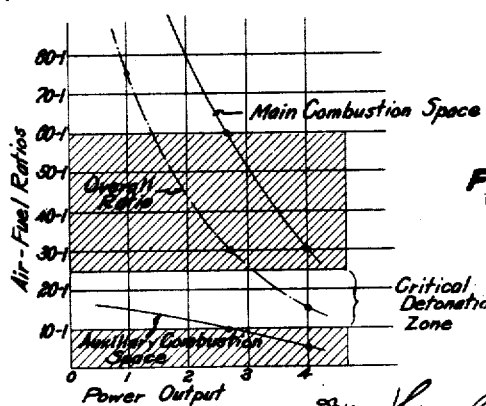
Inventor:
Neil O. Broderson
By Harold T. Stowell
Attorneys.

Patented Oct. 5, 1954

2,690,741

UNITED STATES PATENT OFFICE 2,690,741

METHOD OF OPERATING INTERNAL-COMBUSTION ENGINES

Neil O. Broderson, Rochester, N. Y.

Application July 31, 1952, Serial No. 301,935

4 Claims. (Cl. 123—30)

1

This invention relates to a method of operating internal combustion engines, particularly four-cycle internal combustion engines.

The conventional four-cycle induction internal combustion engine in its present state of development has several serious defects. Particularly important among these is the relative inefficiency of such engines. Maximum efficiency is obtained only over a narrow range of power output, which range is usually located near the maximum power output of the engine. This is due, in part, to the fact that in a given engine using a particular fuel there is a certain optimum ratio of fuel to air in the mixture which will ignite and burn evenly without detonation to deliver a smooth flow of power to the piston. This ratio may be varied somewhat without seriously reducing efficiency, but the limits of variation are much narrower than the range of power output required to be delivered by the engine. The displacement of the engine, the compression ratio, and maximum usable fuel to air ratio are factors determining the upper limit of power output of the engine. At lower than maximum power demand, the amount of fuel fed must be reduced, but this reduction can be continued only to a limited extent before the mixture becomes too lean properly to operate the engine. Before this point is reached, conventional induction engines provide for throttling the air taken into the combustion chamber as the amount of fuel fed is reduced in order to maintain the fuel to air ratio within ignitable and operable limits. Throttling, by decreasing the volume of air in the cylinder, reduces the efficiency of conversion of the heat energy from the combustion of fuel into useful work, and, furthermore, at low power demands, more fuel per unit of air must be added to the combustion chamber than corresponds to the lowered demand in order to keep the fuel to air ratio within ignitable limits, thus resulting in a waste of fuel and a loss in efficiency.

In my method of operating an internal combustion engine, air is drawn into the combustion space substantially unthrottled under all conditions of operation. Notable advantages ensue; namely, a uniform compression ratio is provided at all degrees of power output. This is especially advantageous at low power output where a higher than usual compression ratio may be utilized in conjunction with segregation of the fuel adjacent the locus of ignition at the time of ignition and the provision of a body of substantially pure air under compression in other parts of the combustion space remote from the locus of ignition.

2

More efficient utilization of the combustion energy of the fuel is thereby obtained, because the substantially pure air readily absorbs and transmits to the piston the energy liberated by combustion of the fuel. This energy is used to do work and is not dissipated as heat through the walls of the cylinder.

Another defect of the conventional induction internal combustion engine is that the modern engine operating under a high compression ratio must use specially prepared or treated fuel if detonation is to be largely avoided. Even when such fuels are used, detonation occurs under some conditions of operation. Detonation has been explained as being due to the exploding of the fuel-air mixture in the unburned mixture preceding the flame. A flame front radiates outwardly from the point of ignition which compresses and heats the mixture in advance of it until a point is reached where the remaining unburned mixture attains a state of high compression and high temperature sufficient to cause it to explode. This explosion is commonly referred to as "knock", and when an engine "knocks" the efficiency, power output, smoothness and quietness of operation are deleteriously affected.

An object of this invention is to provide a method of operating a four-cycle internal combustion engine so that higher overall efficiency is attained at all speeds and degrees of power output of which the engine is capable with a given fuel.

Another object of the invention is to provide a method of operating such an engine whereby substantially to reduce the tendency to detonate under all conditions of engine output, and thereby to achieve quiet, smooth and efficient operation of the engine.

Another object of the invention is to provide a method of operating an internal combustion engine of the type specified using low grade fuel without loss of efficiency while avoiding objectionable detonation. High test fuels and those containing "anti-knock" preparations can be used at higher compression than the present limit by means of the method of the invention, for the principle under which it is operated obviates knock.

Further objects and advantages of the invention will be in part apparent and in part pointed out in the following description taken in connection with the accompanying drawings in which:

Fig. 4 is a sectional view of a combustion chamber and associated parts adapted to be operated in a further embodiment of the principles of the invention;

Fig. 5 is a graph showing the relation of fuel feed to piston position in a typical illustrative embodiment of the invention, and Fig. 6 is a graph illustrating the method of the invention and showing particularly how detonation is suppressed.

Figure 1:
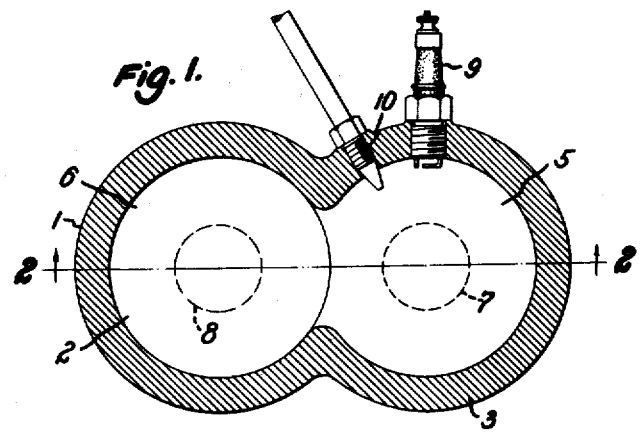
Fig. 1 is a sectional view, taken along the line 1—1 of Fig. 2 looking in the direction of the arrows, of one form of combustion chamber and associated parts of an internal combustion engine adapted to be operated in accordance with the principles of this invention.

The method of operating an internal combustion engine according to this invention comprises admitting air to the combustion chamber of the engine and compressing the air within the combustion chamber, injecting into an auxiliary combustion zone communicating with and forming part of the combustion chamber controlled charges of fuel increasing in amount with increasing power demand upon the engine during a controlled period of time comprised between the beginning of induction and the completion of compression, effecting a differential distribution of the fuel between the auxiliary combustion zone and the remaining portion of the combustion chamber to provide in said auxiliary combustion zone an ignitable fuel mixture at the time of ignition under all conditions of power demand, and igniting the mixture under compression in the auxiliary combustion zone.

More particularly, the method of the invention comprises admitting substantially constant charges of air to the combustion chamber of a four-cycle internal combustion engine, at least a part of the air preferably being admitted through an auxiliary combustion chamber communicating with the main combustion chamber through a restricted passage and having a volume not substantially exceeding the volume of the main combustion chamber at top center position of the piston and preferably from 10% to 50% of the volume of the total combustion space at top center position of the piston, compressing the air within the combustion chambers, supplying to said combustion chambers controlled charges of fuel increasing in amount with increased power demand upon the engine, at least a portion of the fuel being injected into the auxiliary combustion chamber during the compression stroke in amount varied with respect to the total quantity of fuel supplied to effect a controlled stratification or segregation of the total fuel supply between the auxiliary combustion chamber and the main combustion chamber and to provide in the auxiliary combustion chamber at the time of ignition an ignitable fuel mixture under all conditions of power demand irrespective of variation in the composition of the fuel-air mixture obtained in the main combustion chamber. Advantageously the distribution of the fuel between the auxiliary and main combustion chambers is controlled to provide a fuel-air composition in the main combustion chamber which is outside the range of detonating compositions under all conditions of power demand.

The fraction of the fuel which is injected into the auxiliary combustion chamber during the compression stroke is related to the relative sizes of the auxiliary and main combustion chambers, to the power demand on the engine, and to the composition range of ignitable mixtures of the fuel in use, by the formula $$X = \frac{CAV - ABF}{BF - ABF}$$

in which X is the fraction of the fuel charge injected into the auxiliary combustion chamber during the compression stroke; V is the number of unit weights of air contained in the total combustion space at top center position of the piston (that is, V is the total volume of the combustion space expressed in unit weights of air); A is the fraction of the total combustion space at top center position of the piston contained in the auxiliary combustion chamber (A is preferably not substantially outside the range 0.1 to 0.5); F is the unit weights of fuel supply per charge at full load; B is the amount of the load expressed as a fraction of the fuel supply at full load (thus BF is the unit weights of fuel per charge at any fraction of full load); C is the composition of the fuel mixture in the auxiliary combustion chamber, selected from the ignitable range of mixtures of the fuel in air, expressed as a fraction of the mixture of air and fuel. C will vary with the particular fuel used and for any particular fuel can be selected from a definite range of values. Advantageously C is so selected as to provide a non-detonating fuel mixture in at least the main combustion chamber.

In the operation of an internal combustion engine in accordance with the invention, the total fuel supply may be injected into the auxiliary combustion chamber, the duration and timing of the injection being varied with respect to the intake and compression strokes in accordance with the principles set forth above, or the portion of the fuel supplied during the intake stroke may be mixed with the intake air before it is supplied to the combustion chamber, only that portion of the fuel supplied during the compression stroke being injected into the auxiliary combustion chamber. The latter method of operation is particularly advantageous when part of the air is admitted directly into the main combustion chamber, and this method of operation is essential when all of the air is admitted directly into the main combustion chamber.

When a portion of the fuel charge is inducted into the combustion chambers with the air charge, the variation of the amount of fuel injected into the auxiliary combustion chamber during the compression stroke may be effected in various ways. For example, the amount of fuel injected into the auxiliary chamber may be constant under all conditions of load and the timing varied to inject varying portions of the injected fuel during the intake and compression strokes, or the entire amount of injected fuel may be injected during the compression stroke, the amount being varied to provide ignitable mixtures in the auxiliary chamber under all conditions of power demand. It is also possible to vary both the timing and the amount of the injected portion of fuel.

In Fig. 1, 1 represents the walls providing a cylinder accommodating the reciprocating piston 2 of a four-cycle internal combustion engine. The reference numeral 3 indicates an offset wall providing, together with the cylinder head 4, an auxiliary combustion zone 5. The main combustion zone 6 overlies the piston 2. An intake valve 7 is provided for the admission of air or a mixture of air and fuel during the induction stroke of the piston, and this valve is timed to operate as is conventional in four-cycle engines. Exhaust valve 8 is positioned in the cylinder head over the piston and it also operates conventionally to permit egress of the products of combustion on the exhaust stroke. An ignitor 9 is located in side wall 3 and extends into the auxiliary combustion chamber for the purpose of igniting the fuel-air mixture therein at or near top dead center of the piston between the compression stroke and the power stroke. The timing of the firing is adjusted in the conventional manner. A fuel injector 10 also enters wall 3 for injecting or spraying fuel or a rich mixture of fuel and air into the auxiliary combustion zone 5. A fuel pump (not shown) supplies metered and variable quantities of fuel and injects the same periodically through the nozzle into the auxiliary combustion zone. The quantity of fuel injected and the period of injection are controllable variables as will be more fully explained hereinafter.

In operation, air or a mixture of air and fuel is drawn into the combustion space on the induction stroke through intake valve 7. Preferably this air is not throttled for low power operation, but is drawn in unthrottled for all conditions of operation.

At least a portion of the fuel employed is injected into the auxiliary combustion zone 5 by nozzle 10. An important feature of this invention is the timing of the period of injection of the fuel and the quantity of fuel injected in accordance with the power demand upon the engine.

The fuel injector need not be positioned as shown so long as it is positioned to inject fuel into the auxiliary combustion zone. For example, it may be placed at the necked-down juncture of the main combustion zone and the auxiliary combustion zone or it may be situated in the side wall of the main combustion zone and directed at the auxiliary combustion zone across the main combustion zone.

Figure 3:
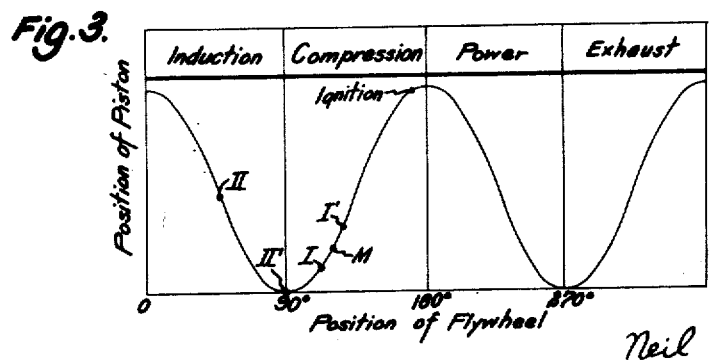
Fig. 3 is a graph of the operation of a four-cycle engine in accordance with the invention.

Fig. 3 shows in graph form how the operation of a four-cycle engine in accordance with the invention is carried out. The curve is sinusoidal and represents the position of the piston with respect to the flywheel. The time of ignition and the various periods of fuel injection are indicated on the curve.

At low power demand, as when the engine is idling, very little fuel is required. Under these conditions, all the fuel may be injected into the auxiliary combustion chamber during the compression stroke. For example, fuel injection may be started at some point I and stopped at some point I'. Substantially all the fuel so injected remains in the auxiliary combustion zone due to the inrush of air from the main combustion zone. The quantity of fuel injected is regulated so that a readily combustible mixture is adjacent the locus of ignition at the time of ignition. The main combustion chamber contains substantially only air. By this method of operating, it is possible to have an ignitable combustible mixture at the firing point when the spark is made, which mixture is sufficient to keep the engine idling, while the entire fuel charge is considerably less than would be required were the fuel mixed with the air prior to its induction into the cylinder.

The mean period of injection of fuel may be defined as the point in the cycle when half the fuel has been injected into the combustion zone. With respect to the fuel injected between I and I', this may be represented by a point M in Fig. 3. As the engine is called upon to deliver increasing power to a maximum, the mean period of fuel injection is advanced. This may be accomplished by advancing the time when injection is started while keeping fixed the rate of injection and the time when injection is stopped, thereby increasing concomitantly the amount of fuel injected. Or, the mean period of fuel injection may be advanced together with an increase in the amount of fuel injected in any convenient way.

The period of fuel injection may be advanced until the point of first injection reaches a point II on the curve which is located about 20% of the way down the intake stroke. This point may be reached under full load operating conditions. Preferably under all conditions of operation the injection is not stopped until after the compression stroke has begun, although with some engine designs it may be desirable to inject all the fuel on the intake stroke under some load conditions. If the last part of the injection occurs during the compression stroke, the mixture in the auxiliary combustion zone will be somewhat richer than the mixture in the rest of the combustion chamber. The auxiliary and main combustion zones preferably are proportioned so that the maximum power output is attained when the last moiety of the fuel injected is introduced at the start of the compression stroke when the mean period of injection is fully advanced. As the mean period of injection is advanced, the amount of fuel injected is increased.

The following examples are given to illustrate the operation of an internal combustion engine of the general form shown in Fig. 1 in accordance with the principles of the invention. In these examples all the fuel is injected into the auxiliary combustion chamber and all the air is supplied through this chamber.

*Example 1.—Full load operation*

For purposes of this example, it is assumed that the main combustion space 6 and the auxiliary combustion space 5 of the engine of Fig. 1 are of equal volume when the piston is at top dead center, the sum of the volumes totaling 150 arbitrary units. Moreover, it is assumed that the proper mixture for full load operation is 150 parts of air to 10 parts of fuel in the entire combustion chamber.

The injection of fuel is so timed that one-half of the fuel is introduced on the intake stroke of the piston and the remaining half is introduced on the compression stroke. At the end of the intake stroke there is a mixture in 5 and 6 consisting of 5 parts of fuel and 150 parts of air, or a 30 to 1 mixture. Five parts of fuel are introduced on the compression stroke, either directly into the auxiliary combustion zone or in the path of the mixture which the piston is forcing from the main combustion chamber to the auxiliary combustion chamber. At the time of ignition the mixture is distributed as follows: in the main combustion space there are 2.5 parts of fuel which were introduced on the induction stroke and 75 parts of air (30 to 1 mixture); in the auxiliary combustion space there are 7.5 parts of fuel, of which 2.5 parts were introduced during induction of air and 5 parts were added during compression, and 75 parts of air (10 to 1 mixture). In tabular form, the mixture distribution at the time of ignition appears below:

| Combustion Space | Air | Fuel | Mixture |
|---|---|---|---|
| Main | 75 | 2.5 | 30–1 |
| Auxiliary | 75 | 7.5 | 10–1 |
| Entire | 150 | 10.0 | 15–1 |

By varying the time of fuel injection with respect to the time change-over from induction to compression, it is possible to obtain almost any desired ratio of fuel distribution between the two combustion spaces, within the limits of (1) uniform fuel distribution throughout the entire combustion zone to (2) no fuel in the main combustion zone and all fuel in the auxiliary combustion space. By injecting all of the fuel on the induction stroke, a uniform distribution of fuel throughout the entire combustion chamber results. By injecting all of the fuel on the compression stroke, substantially none finds its may into the main combustion space, substantially all of it remaining in the auxiliary combustion zone. Intermediate conditions of fuel distribution are obtained by varying the period of fuel injection so that the time of change-over from induction to compression occurs during the injection period.

The above example describes full load operation only, using a total mixture of 15 to 1. The advantage of operating at full load with two different mixture strengths in a common combustion chamber is that detonation is obviated or at least minimized. A relatively rich mixture is maintained in the vicinity of the ignitor to assure ready combustion while a relatively lean mixture exists in the rest of the combustion chamber remote from the ignitor to discourage detonation. This differential distribution is effected while charging fuel and air in proportions to give maximum power and most efficient results.

*Example 2.—Part load operation*

In conventional induction type four-cycle engines, which induce a preformed air-fuel mixture from a carburetor or the like, reducing the amount of fuel without reducing the amount of air results in creating a leaner mixture. Therefore, if only 5 parts of fuel is added to 150 parts of air for low power output, a mixture of 30 to 1 results, which is too lean to ignite satisfactorily, if at all. Throttling may be employed to reduce the amount of air taken into the cylinder as the amount of fuel is reduced, but such throttling, by reducing the volume of air in the cylinder, necessarily results in a correspondingly low compression and greatly reduces the efficiency of conversion of the heat energy into useful work.

If in the engine of Example 1 the time of fuel injection is retarded so that all of the fuel (5 parts in this example) is introduced during compression, the combustible mixture will be localized in the auxiliary combustion space just prior to firing. At the time of ignition the fuel distribution between the auxiliary and main combustion spaces would be as follows:

| Combustion Space | Air | Fuel | Mixture |
|---|---|---|---|
| Main | 75 | 0 | |
| Auxiliary | 75 | 5 | 15–1 |
| Entire | 150 | 5 | 30–1 |

At the locus of ignition in the auxiliary combustion zone there would exist a readily ignitable mixture of 15 to 1. In the main combustion space only air would be entrapped. By thus localizing the fuel adjacent the ignitor a lean average mixture of 30 to 1 effectively can be utilized without sacrificing compression by throttling air. Detonation also is overcome by having a leaner mixture existing in the combustion chamber remote from the point of ignition so that as the flame front radiates away from the point of ignition the unburned mixture in advance of it is always too lean to explode violently giving rise to detonation.

*Example 3.—Minimum idling conditions*

This example, together with Examples 4 and 5, constitutes a series. In these last three examples the following conditions apply:

(1) Volume of entire combustion space=150 units
(2) Minimum fuel requiring for idling=2 parts
(3) Optimum mixture at locus of ignition at time of ignition=15–1

Figure 2:
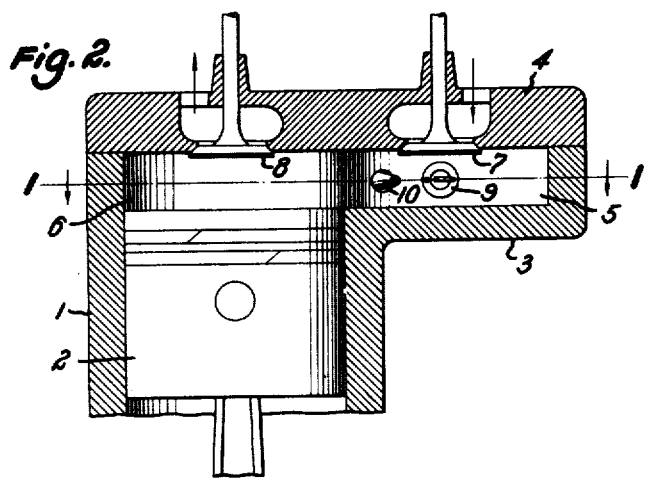
Fig. 2 is a sectional view of the apparatus shown in Fig. 1 taken along the line 2—2 of the latter figure.

The combustion chamber of the engine is proportioned so that the minimum fuel required for idling is contained entirely within the auxiliary combustion zone as a 15 to 1 air-fuel mixture at the time of ignition. This requires that the auxiliary combustion zone be one-fifth the total volume of the combustion chamber with the piston at top dead center, or, in other words, that it have a volume of 30 units. The structure of the chamber may be like that shown in Figs. 1 and 2 of the drawings with appropriate adjustment in the relative sizes of spaces 5 and 6.

Under idling conditions two parts of fuel are introduced into the auxiliary combustion zone on the compression stroke. The table immediately below illustrates the conditions obtaining in the combustion chamber at the moment of firing.

| Combustion Space | Air | Fuel | Mixture |
|---|---|---|---|
| Main | 120 | 0 | |
| Auxiliary | 30 | 2 | 15–1 |
| Entire | 150 | 2 | 75–1 |

Great fuel economy is obtained at idling conditions, for, in effect, an average air-fuel mixture of 75 to 1 is burned, which mixture in the absence of proper fuel distribution is practically non-combustible under the conditions of operation.

*Example 4.—Intermediate operating conditions*

To operate the engine of Example 4 under an intermediate condition of power output, it will be assumed that 6 parts of fuel will provide the demand. The mean period of fuel injection is advanced until 5 parts of fuel are injected on the induction stroke and 1 part is injected on the compression stroke. This results in a fuel distribution at the time of ignition as set forth in the following table:

| Combustion Space | Air | Fuel | Mixture |
|---|---|---|---|
| Main | 120 | 4 | 30–1 |
| Auxiliary | 30 | 2 | 15–1 |
| Entire | 150 | 6 | 25–1 |

The optimum air-fuel mixture of 15 to 1 is maintained in the auxiliary combustion zone, and a much leaner mixture of 30 to 1 obtains elsewhere in the combustion chamber.

*Example 5.—Limiting operating conditions*

The upper limit of power output of the engine consistent with providing a 15 to 1 mixture at the locus of ignition at the time of ignition is reached when 10 parts of fuel is injected into the auxiliary combustion zone entirely during the induction stroke of the engine. Substantially complete mixing and homogeneous distribution of the fuel in the air is thereby accomplished. At the moment of firing, the distribution of the mixture between the two spaces is as shown in the following table:

| Combustion Space | Air | Fuel | Mixture |
| --- | --- | --- | --- |
| Main | 120 | 8 | 15-1 |
| Auxiliary | 30 | 2 | 15-1 |
| Entire | 150 | 10 | 15-1 |

For maximum power output with a minimum of detonation, it may be desirable to reduce the total fuel injected to a value somewhat below 10 and to retard slightly the period of fuel injection to a point where the last portion of the fuel is injected on the compression stroke and substantially retained within the auxiliary combustion zone to keep the mixture strength there at 15 to 1. A somewhat lower mixture strength will then obtain in the main combustion space and detonation will thereby be minimized.

It may be desirable, at maximum power output, to provide a somewhat different adjustment of the mixtures existing in the two combustion spaces for minimizing detonation. Assuming that a 15 to 1 overall mixture strength is desired, 10 parts of fuel might be injected as follows: 8.75 parts during the induction phase and 1.25 parts during the compression phase of operation. At the time of ignition, then, the distribution under such operating conditions would be as shown in the table below:

| Combustion Space | Air | Fuel | Mixture |
| --- | --- | --- | --- |
| Main | 120 | 7 | 17.14-1 |
| Auxiliary | 30 | 3 | 10-1 |
| Entire | 150 | 10 | 15-1 |

A relatively rich mixture of 10 to 1 would obtain in the auxiliary combustion space and a leaner mixture of 17.14 to 1 would obtain elsewhere in the combustion space.

For the purpose of simplification, complicating factors, such as diffusion and convection, have not been expressly considered in the foregoing examples, but these factors do not alter the principles involved. In practice, a sharp boundary of demarkation between the mixtures in the main and auxiliary combustion spaces is not obtained. Instead a zone exists between the two spaces in which the transition between the mixture strengths is rather gradual. This is desirable because it tends to smooth out the propagation of the flame front through the combustion chamber.

In general, it may be said that fuel supplied on the intake stroke is uniformly distributed throughout both spaces of the combustion chamber while fuel injected on the compression stroke is substantially completely retained in the auxiliary combustion zone. However, this distribution may be somewhat modified in practice due to the many possible forms of double-spaced combustion chambers, the positioning and operation of the intake and exhaust valves, the location of the fuel injecting nozzle, and other factors. The most desirable construction of a combustion chamber for applying the method of this invention to the operation of internal combustion engines should enable the incoming air to pass through any fuel which is injected into the auxiliary combustion zone on the induction stroke of the motor, to effect uniform distribution of such fuel throughout the entire combustion chamber.

In the engine illustrated in Fig. 4, provision is made for the admission of air or of air-fuel mixtures both to the auxiliary combustion chamber and to the main combustion chamber. In Fig. 4, 11 represents the walls of the cylinder and 12 the piston of a four-cycle internal combustion engine. Cylinder head 13 encloses main combustion chamber 14 including an offset portion, as in conventional L-head engines. In the offset portion is a main intake valve 15 and an exhaust valve (not shown). The cylinder head 13 is provided with an auxiliary head 16 which may, for example, be fitted into the conventional spark plug opening and which provides an auxiliary combustion chamber 17 communicating with the main combustion chamber 14 through passage 18. The auxiliary head 16 is provided with a fuel injection nozzle 19, a spark plug 20, and an auxiliary intake valve 21. When air-fuel mixtures are admitted to the combustion chamber during the intake stroke through the intake valves, both main intake valve 15 and auxiliary intake valve 21 are preferably connected to a common manifold leading from a suitable air and fuel mixing device 22.

The following further examples are directed to the operation of an engine of the type shown in Fig. 4 in which the volume of the auxiliary combustion chamber is 20% of the volume of the entire combustion space at top center position of the piston. The examples are further particularly directed to show the control of the portion of fuel injected into the auxiliary combustion chamber during the compression stroke to provide non-detonating mixtures of fuel and air in the main combustion chamber under all conditions of power demand while maintaining an ignitable mixture in the auxiliary combustion chamber.

A total combustion chamber volume equivalent to 150 unit weights of air is assumed and the critical detonation zone is assumed to cover air-fuel mixtures of from 10 to 1 to 25 to 1.

*Example 6.—Full load*

At full load, half of the total fuel charge is supplied to the combustion chamber during the intake stroke, either by injection into the auxiliary chamber or by admission into the chambers in admixture with the air, and half the charge is injected into the auxiliary combustion chamber during the compression stroke.

| Combustion Space | Fuel Charge | | Air-Fuel Ratio |
| --- | --- | --- | --- |
| | On Intake | On Compression | |
| Auxiliary | 1 | 5 | 5-1 |
| Main | 4 | | 30-1 |
| Total | 5 | 5 | 15-1 |

*Example 7.—Half load*

At half load, half of the total fuel charge is again supplied during the intake stroke and half is injected into the auxiliary combustion chamber.

| Combustion Space | Fuel Charge | | Air-Fuel Ratio |
|---|---|---|---|
| | On Intake | On Compression | |
| Auxiliary | ½ | 2½ | 10-1 |
| Main | 2 | | 60-1 |
| Total | 2½ | 2½ | 30-1 |

*Example 8.—Low load*

At idling loads, the entire fuel charge amounting to 20% of the fuel charge at full load is injected into the auxiliary combustion chamber during the compression stroke.

| Combustion Space | Fuel Charge | | Air-Fuel Ratio |
|---|---|---|---|
| | On Intake | On Compression | |
| Auxiliary | | 2 | 15-1 |
| Main | | | 100% Air |
| Total | | 2 | 75-1 |

The variation in the time and period of injection in relation to crank angle and piston displacement for the conditions of Examples 6, 7 and 8 is shown diagrammatically in Fig. 5.

Fig. 6 is a graph showing the variation of air-fuel ratios with power output in the main combustion chamber and auxiliary combustion chamber in Examples 6, 7 and 8. This graph clearly shows how the presence of air-fuel compositions within the critical detonation zone is avoided both in the main and auxiliary combustion chambers at high loads, thus making possible the use of very high pressures and correspondingly increased power outputs without detonation even with relatively sensitive fuels.

The following further Examples 9, 10 and 11, are illustrative of a variation in the method of the invention in which portions of the fuel, increasing with increasing power demand, are inducted into the combustion chambers with the air and further portions are injected into the auxiliary combustion chamber entirely during the compression stroke, the amounts so injected being varied in relation to the total fuel supplied to maintain an ignitable mixture in the auxiliary combustion chamber under all conditions of power demand. The volume relation of the combustion chambers and the assumed conditions are the same as in Examples 6–8.

*Example 9.—Full load*

At full load, 96% of the fuel charge is inducted into the combustion chambers with the air charge and 4% of the fuel charge is injected into the auxiliary combustion chamber during the compression stroke.

| Combustion Space | Fuel Charge | | Air-Fuel Ratio |
|---|---|---|---|
| | Inducted | Injected | |
| Auxiliary | 1.6 | 0.4 | 15-1 |
| Main | 8 | | 15-1 |
| Total | 9.6 | 0.4 | 15-1 |

The fuel-air ratios may, of course, be varied as discussed under Example 5.

*Example 10.—Half load*

At half load, 75% of the fuel charge is inducted with the air supply and 25% is injected into the auxiliary combustion chamber during the compression stroke.

| Combustion Space | Fuel Charge | | Air-Fuel Ratio |
|---|---|---|---|
| | Inducted | Injected | |
| Auxiliary | 0.75 | 1.25 | 15-1 |
| Main | 3 | | 40-1 |
| Total | 3.75 | 1.25 | 30-1 |

*Example 11.—Low load*

At idling loads the entire fuel charge amounting to 20% of the fuel charge at full load is injected into the auxiliary combustion chamber during the compression stroke as in Example 8.

Examples 12, 13 and 14 are illustrative of a further variation in the method of the invention in which portions of the fuel increasing with increasing power demand are inducted into the combustion chambers with the air as in Examples 9–11, and constant portions of fuel are injected into the auxiliary combustion chamber, the timing of the injection being advanced with increasing power to vary the amount injected during the compression stroke to maintain an ignitable mixture in the auxiliary combustion chamber during all conditions of power demand. The volume relations of the combustion chambers and the assumed conditions are as in Examples 6–11.

*Example 12.—Full load*

At full load, 80% of the fuel charge is inducted into the combustion chambers with the air charge and 20% of the fuel charge is injected into the auxiliary combustion chamber, three-fourths on the intake stroke and one-fourth on the compression stroke.

| Combustion Space | Fuel Charge | | | Air-Fuel Ratio |
|---|---|---|---|---|
| | Inducted | Injected | | |
| | | Intake | Compression | |
| Auxiliary | 1.6 | .3 | .5 | 12.5-1 |
| Main | 6.4 | 1.2 | | 16-1 |
| Total | 8 | 1.5 | .5 | 15-1 |

*Example 13.—Half load*

At half load, 60% of the fuel is inducted with the air and 40% is injected into the auxiliary combustion chamber, 37.5% of the latter being injected during the intake stroke and 62.5% during the compression stroke.

| Combustion Space | Fuel Charge | | | Air-Fuel Ratio |
|---|---|---|---|---|
| | Inducted | Injected | | |
| | | Intake | Compression | |
| Auxiliary | 0.6 | 0.15 | 1.25 | 15-1 |
| Main | 2.4 | 0.6 | | 40-1 |
| Total | 3 | 0.75 | 1.25 | 30-1 |

*Example 14.—Low load*

At idling loads the entire fuel charge amounting to 20% of the fuel charge at full load is injected into the auxiliary combustion chamber during the compression stroke as in Examples 8 and 11.

For the sake of clarity and simplicity of exposition, the invention has been described as applied to an engine having only a single cylinder, but it is obvious that the invention applies equally to multi-cylinder internal combustion engines.

The fuel may be mixed with a small amount of air and injected through the nozzle. Preferably the amount of air used is insufficient to form a combustible mixture with the fuel. It is to be understood that the invention is not limited to operating with so-called "solid injection" of fuel.

The nozzle for injecting fuel specifically forms no part of the present invention. It may be any of the well known fuel injecting nozzles at present available, but preferably it should be capable of producing an extremely fine, almost gasified, spray of fuel.

Means for metering the fuel and timing the period of fuel injection preferably are synchronized to operate in phase with the engine and preferably are provided with means for varying at will the amount of fuel injected per cycle, together with means for varying the mean period of fuel injection with changing power demand upon the engine. Such means constitute no part of this invention and they may be of any known or desired type.

This application is a continuation-in-part of my application Serial No. 442,830, filed May 13, 1942, now Patent 2,615,437, issued October 28, 1952, which is a continuation-in-part of my application Serial No. 320,208, filed February 21, 1940, now abandoned.

I claim:

1. The method of operating a four-cycle internal combustion engine which comprises admitting constant charges of air to the combustion space of the engine including a main combustion chamber and an auxiliary combustion chamber communicating with the main combustion chamber through a restricted passage and having a volume not substantially exceeding the volume of the main combustion chamber at the top center position of the piston, compressing the air within the combustion chamber, supplying to the combustion chambers controlled charges of fuel varied in amount in relation to power demand upon the engine, one portion of said fuel charges being inducted into the combustion chambers in admixture with the air in amounts increasing with increasing power demand, and a further portion of said fuel charges being injected into the auxiliary combustion chamber at least in part during the compression stroke the amount of fuel so injected during the compression stroke being varied in predetermined relation to the total quantity of fuel supplied to effect a controlled stratification of the fuel between the auxiliary combustion chamber and the main combustion chamber and to provide in the auxiliary combustion chamber at the time of ignition an ignitable fuel mixture under all conditions of power demand irrespective of variations of the fuel-air mixture obtained in the main combustion chamber, and igniting the mixture under pressure in the auxiliary combustion chamber.

2. The method of operating a four-cycle internal combustion engine which comprises admitting constant charges of air to the combustion space of the engine including a main combustion chamber and an auxiliary combustion chamber communicating with the main combustion chamber through a restricted passage and having a volume from 0.1 to 0.5 the volume of the total combustion space at the top center position of the piston, compressing the air within the combustion chamber, supplying to the combustion chambers controlled charges of fuel varied in amount in relation to power demand upon the engine, one portion of said fuel charges being inducted into the combustion chambers in admixture with the air in amounts increasing with increasing power demand, and a further portion of said fuel charges being injected into the auxiliary combustion chamber at least in part during the compression stroke the amount of fuel so injected during the compression stroke being varied in predetermined relation to the total quantity of fuel supplied to effect a controlled stratification of the fuel between the auxiliary combustion chamber and the main combustion chamber and to provide in the auxiliary combustion chamber at the time of ignition an ignitable fuel mixture under all conditions of power demand irrespective of variations of the fuel-air mixture obtained in the main combustion chamber, and igniting the mixture under pressure in the auxiliary combustion chamber.

3. The method of operating a four-cycle internal combustion engine as defined in claim 1 wherein the amount of fuel injected into the auxiliary combustion chamber is constant under all conditions of power demand, the timing of the injection being varied to inject a portion thereof during the compression stroke which is varied in amount in predetermined relation to the total quantity of fuel supplied to provide in the auxiliary combustion chamber at the time of ignition an ignitable fuel mixture under all conditions of power demand irrespective of variations of the air-fuel mixture obtained in the main combustion chamber.

4. The method of operating a four-cycle internal combustion engine as defined in claim 1 wherein the portion of fuel injected into the auxiliary combustion chamber is injected entirely during the compression stroke, the amount so injected being varied in predetermined relation to the total quantity of fuel supplied to provide in the auxiliary combustion chamber at the time of ignition an ignitable fuel mixture under all conditions of power demand irrespective of variations of the air-fuel mixture obtained in the main combustion chamber.

References Cited in the file of this patent

UNITED STATES PATENTS

| Number | Name | Date |
|---|---|---|
| 1,616,157 | Werner | Feb. 1, 1927 |
| 2,615,437 | Broderson | Oct. 28, 1952 |

FOREIGN PATENTS

| Number | Country | Date |
|---|---|---|
| 465,507 | Great Britain | July 31, 1935 |

UNITED STATES PATENT OFFICE

CERTIFICATE OF CORRECTION

Patent No. 2,690,741 October 5, 1954

Neil O. Broderson

It is hereby certified that error appears in the above numbered patent requiring correction and that the said Letters Patent should read as corrected below.

In the drawings, at the bottom of Fig. 3, for "90°", "180°", and "270°", respectively, read -- 180° --, -- 360° --, and -- 540° --.

Signed and sealed this 8th day of March 1960.

(SEAL)
Attest:

KARL H. AXLINE
Attesting Officer

ROBERT C. WATSON
Commissioner of Patents